United States Patent [19]

James

[11] Patent Number: 4,815,552
[45] Date of Patent: Mar. 28, 1989

[54] RACK AND PINION GEAR

[75] Inventor: George K. James, Crewe, England

[73] Assignee: Rolls-Royce Motor Cars Limited, Cheshire, England

[21] Appl. No.: 97,821

[22] Filed: Sep. 17, 1987

[30] Foreign Application Priority Data

Sep. 20, 1986 [GB] United Kingdom ............... 8622691

[51] Int. Cl.$^4$ .................................................. B62D 5/06
[52] U.S. Cl. ..................................... 180/148; 74/498
[58] Field of Search ............... 180/148, 149; 280/96; 74/498, 388 PS

[56] References Cited

U.S. PATENT DOCUMENTS 3,061,036 10/1962 Barton et al. .................... 180/148

FOREIGN PATENT DOCUMENTS 0119922 9/1984 European Pat. Off. .
2404077 8/1975 Fed. Rep. of Germany ...... 180/148
3118254 11/1982 Fed. Rep. of Germany .
2024878 9/1970 France .
55-119566 9/1980 Japan ................................ 180/148
55-119567 9/1980 Japan ................................ 180/148
813312 5/1959 United Kingdom .
1355811 6/1974 United Kingdom .

Primary Examiner—John A. Pekar
Attorney, Agent, or Firm—Cushman, Darby & Cushman

[57] ABSTRACT

A center take of power assisted steering arrangement comprises a rack and pinion in which the rack is constrained radially in a pressure fluid cylinder at two positions and has a floating piston at one end. One constraint comprises a bearing disposed at the point where rack and pinion mesh. With this arrangement meshing of the rack and pinion is not dependent on rack stiffness, manufacturing tolerances are compensated for and the effects of service loads are minimized, while allowing equal area pistons at opposite end of the cylinder.

8 Claims, 2 Drawing Sheets

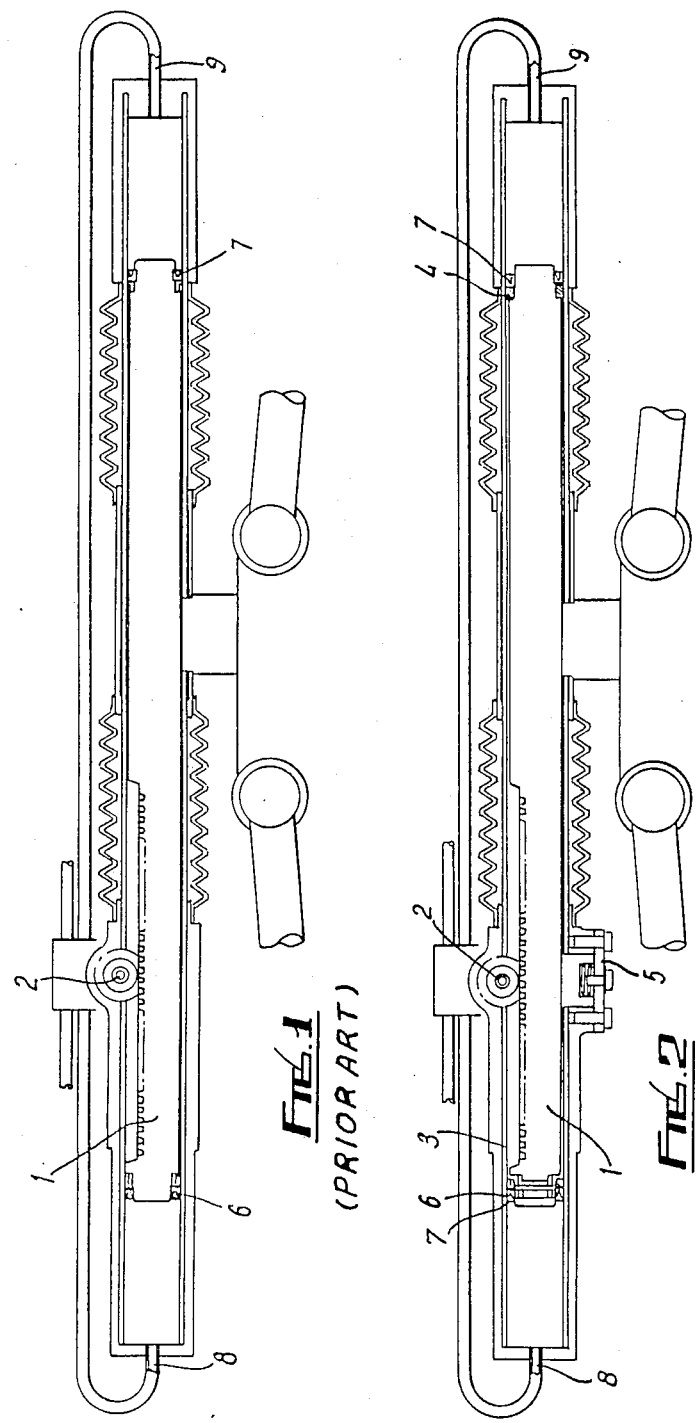

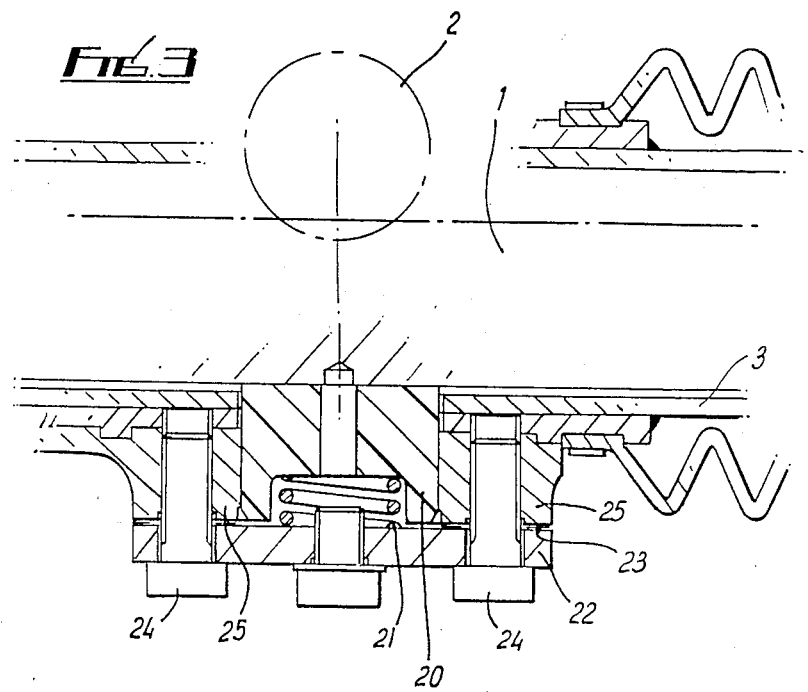
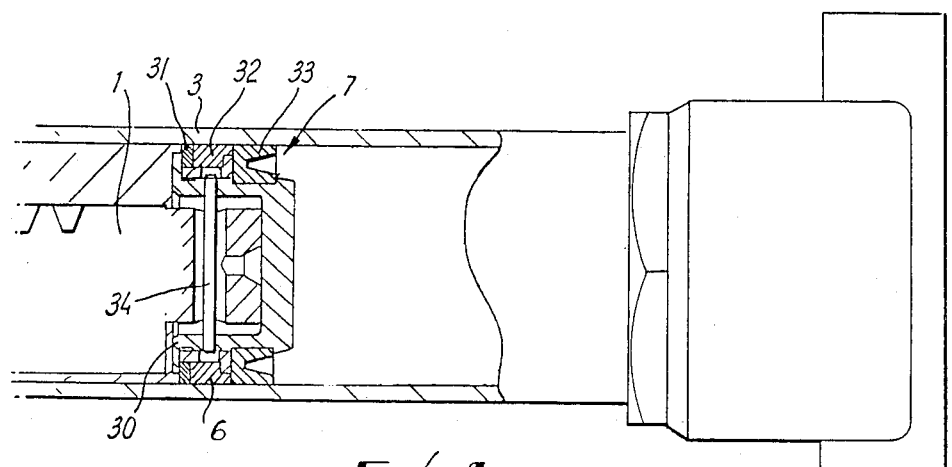

RACK AND PINION GEAR

The present invention relates to a rack and pinion gear particularly, but not exclusively, for a vehicle power assisted steering.

In a known vehicle centre offtake power assisted steering arrangement, the rack provides equal area piston faces to supporting bearings at its opposite ends disposed in a cylinder. In the central position of the steering, the pinion is disposed substantially centrally with respect to the rack. Turning the steering causes pressure fluid to be preferentially diverted through a valve to the appropriate piston face as a result of which the rack is assisted in the appropriate direction. The provision of piston faces of equal area provides for equal power assistance on each lock. Unavoidable dimensional variations of the rack and cylinder, changing stiffness of the rack as it travels past the pinion and deflections caused by service loads, particularly the offset loading on the centre takeoff lead to inconsistent rack/pinion meshing.

According to the present invention, there is provided a rack and pinion gear comprising a rack which may be subject to the action of pressure fluid at either end and which is disposed in a cylinder, a pinion meshing with the rack, a first bearing for the rack adjacent to one end of the rack, and a second bearing for the rack fixed to the cylinder at the position where the pinion and rack mesh, the rack being disposed with clearance in a floating piston at its other end.

Use of a floating piston in conjunction with positioning of the second bearing at the pinion allows equal area pistons at either end of a rack within a cylinder to be constrained radially at two positions only. In this way meshing of the rack and pinion is not dependent on rack stiffness, manufacturing tolerances are compensated for, and the effects of service loads are minimised.

In a preferred embodiment of the invention, the rack forms part of a centre take off power assisted steering arrangement for a vehicle. A seal is provided at the said one end of the rack and the floating piston also incorporates a seal. These seals each comprise a wiper seal, bearing ring and lip seal. The second bearing comprises a slipper which is urged against the rack by a compression spring. The spring is contained within a recess in the slipper and retained there by a plate fixed by bolts to the cylinder. Although in normal operation the floating piston is urged against the adjacent end of the rack a connection between piston and rack is provided for testing purposes.

In order that the invention may be more clearly understood, one embodiment thereof will now be described, by way of example, with reference to the accompanying drawings, in which:

FIG 1 shows a diagrammatic view of an existing centre take off power assisted steering arrangement for a vehicle, FIG. 2 shows a diagrammatic view of a centre take-off power assisted steering arrangement for a vehicle according to the present invention, and FIGS. 3 and 4 show detailed views of parts of the arrangement of FIG. 2.

Referring to FIG. 2 of the drawings, the steering arrangement generally comprises a rack 1 and pinion 2. The rack 1 is supported in a surrounding cylinder 3 through bearings 4 and 5. Pressure fluid seals 6 and 7 are associated with respective ends of the rack. Pressure fluid inlets 8 and 9 lead into chambers disposed at opposite ends respectively of and partially defined by the rack 1 and cylinder 3. These inlets form part of a pressure fluid circuit which incorporates a valve which diverts pressure fluid to one end of the piston or the other depending upon the position of the steering. (Equivalent parts in FIGS. 1 and 2 bear the same reference numerals).

Bearing 4 is conventional, but bearing 5 is not. Bearing 5 is shown in more detail in FIG. 3. It comprises a plastics slipper 20, which is urged against the rack 1 by means of a compression spring 21. This spring 21 is accommodated in a recess in the slipper 20 and held there by a plate 22. The plate in turn is connected to the cylinder 3 by bolts 24 which extends through adjustment shims 23. This bearing 5 opposes the influence of stiffness, manufacturing tolerances and service loads on the rack at precisely the point where it is likely to cause the greatest problem, that is the point at which the pinion and rack mesh.

The end of the rack 1 remote from the bearing 4 is provided with a floating piston arrangement. Referring to FIG. 4, this comprises a piston 30 which surrounds the end of the rack 1 with clearance. The seal 7 comprises a wiper seal 31, bearing ring 32 and lip seal 33 which surround the piston 30. The piston 30 is connected to the rack 1 by means of a roll pin 34 which extends through holes in both the piston and rack. This connection is not necessary during normal operation as the piston is constantly urged against the end of the rack 1 by pressure fluid (oil). However, it is necessary for quality/testing purposes where the gear is stroked in an unpressurised condition in order to maintain a specified level of residual friction. To this end the piston/seal assembly must be retained with the rack.

With the above described arrangement, consistant meshing of pinion and rack is maintained and is not dependant on rack stiffness; manufacturing tolerances are compensated for and effects of service loads minimised.

It will be appreciated that the above embodiment has been described by way of example only and that many variations are possible without departing from the scope of the invention.

I claim:

1. A center take-off power assisted steering arrangement having a rack and pinion gear comprising a rack which is subject to the action of pressure fluid on equal piston areas at either end and which is disposed in a cylinder, a pinion meshing with the rack, a first bearing for the rack adjacent to one end of the rack, and a second bearing for the rack fixed to the cylinder at the position where the pinion and rack mesh, the rack being disposed with clearance in a floating piston at its other end.

2. A rack and pinion gear as claimed in claim 1, in which a seal is provided at the said one end of the rack.

3. A rack and pinion gear as claimed in claim 1, in which the floating piston incorporates a seal.

4. A rack and pinion gear as claimed in claim 1, in which the seal in the floating piston comprises a wiper seal, bearing ring, a lip seal, the bearing ring being operative to locate the floating piston centrally in the cylinder bore, the wiper seal being operative to wipe the cylinder bore in front of the bearing ring and the lip seal being operative to act as a pressure seal against ingress of pressure fluid.

5. A rack and pinion gear as claimed in claim 1, in which the second bearing comprises a slipper which is urged against the rack by a compression spring.

6. A rack and pinion gear as claimed in claim 5, in which the compression spring is disposed in a recess in the slipper and retained there by a plate.

7. A rack and pinion gear as claimed in claim 6, in which the plate is connected to the cylinder by bolts which extend through adjustment shims.

8. A rack and pinion gear as claimed in claim 1, in which the piston is connected to the rack by means of a roll pin which extends through holes in both the piston and the rack.

* * * * *